(12) United States Patent
Chandnani et al.

(10) Patent No.: US 6,445,929 B2
(45) Date of Patent: Sep. 3, 2002

(54) CONVERSION OF INTERNATIONAL MOBILE STATION IDENTITY (IMSI) NUMBER

(75) Inventors: Vishal S. Chandnani, Randolph, NJ (US); Anita R. Garvert, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 3 days.

(21) Appl. No.: 09/283,143

(22) Filed: Apr. 1, 1999

(51) Int. Cl.[7] .......................... H04Q 7/20; H04M 1/00
(52) U.S. Cl. ....................... 455/461; 455/561
(58) Field of Search ................. 455/414, 422, 455/461, 561, 551, 552, 553; 370/342

(56) References Cited

U.S. PATENT DOCUMENTS

| | | |
|---|---|---|
| 4,901,307 A | 2/1990 | Gilhousen et al. ............ 370/18 |
| 5,103,459 A | 4/1992 | Gilhousen et al. ............ 375/1 |
| 5,337,344 A | 8/1994 | Alvesalo |
| 5,699,408 A | 12/1997 | Krolopp et al. ............... 375/59 |
| 5,862,481 A * | 1/1999 | Kulkarni et al. ............. 455/432 |
| 5,867,788 A | 2/1999 | Joensuu ..................... 455/445 |
| 5,883,888 A | 3/1999 | St-Pierre .................... 370/331 |
| 6,029,065 A * | 2/2000 | Shah ......................... 455/414 |

FOREIGN PATENT DOCUMENTS

WO    WO 98/02011    1/1998

* cited by examiner

*Primary Examiner*—Nguyen Vo
(74) *Attorney, Agent, or Firm*—Dickstein Shapiro Morin & Oshinsky LLP

(57) ABSTRACT

A unique method and apparatus for allowing a wireless communication system to offer increased IMSI number functionality and corresponding global roaming capability by converting an identification number received from a particular mobile station in the wireless communication system in a first format to a second format which allows for use of more information included in the identification number is disclosed. A variable length IMSI number in TIA/EIA/IS-95 format is received at a base station in encoded form. The base station decodes the parameters included in the IMSI number into their original decimal values, and, if all parameters have not been sent in accordance with the IMSI type, will add the proper values for the unsent parameters. The MCC, IMSI_S, and IMSI_11_12 parameters of the IMSI number are then stored in a 15-digit IMSI array. The contents of each location of the 15-digit array are associated with a specific location in an 8-octet structure which is required by ANSI/TIA/EIA-41. The value in each location of the array is converted to Binary Coded Decimal (BCD) format and mapped to its associated location in the 8-octet structure. The IMSI number will then be in a format compliant with ANSI/TIA/EIA-41, thus allowing a service provider to offer increased IMSI functionality to its customers and allow the IMSI number to be used as a national mobile station identifier.

54 Claims, 8 Drawing Sheets

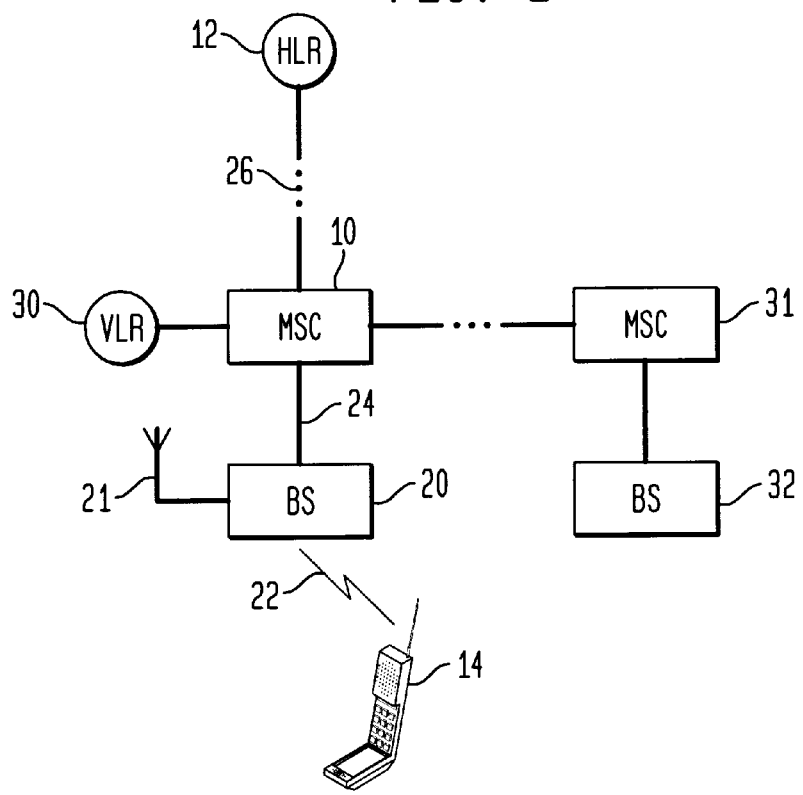

FIG. 5A

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 |

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 3 | 1 | 0 | 0 | 0 | 2 | 0 | 2 | 9 | 5 | 5 | 1 | 2 | 1 | 2 |

| | COL. 1 | | | | COL. 2 | | | |
|---|---|---|---|---|---|---|---|---|
| | H | G | F | E | D | C | B | A |
| ROW 1 | ELEMENT NO. 13 | | | | ELEMENT NO. 14 | | | |
| ROW 2 | ELEMENT NO. 11 | | | | ELEMENT NO. 12 | | | |
| ROW 3 | ELEMENT NO. 9 | | | | ELEMENT NO. 10 | | | |
| ROW 4 | ELEMENT NO. 7 | | | | ELEMENT NO. 8 | | | |
| ROW 5 | ELEMENT NO. 5 | | | | ELEMENT NO. 6 | | | |
| ROW 6 | ELEMENT NO. 3 | | | | ELEMENT NO. 4 | | | |
| ROW 7 | ELEMENT NO. 1 | | | | ELEMENT NO. 2 | | | |
| ROW 8 | FILLER | | | | ELEMENT NO. 0 | | | |

FIG. 7

| H | G | F | E | D | C | B | A |
|---|---|---|---|---|---|---|---|
| 0 | 0 | 0 | 1 | 0 | 0 | 1 | 1 |
| 0 | 0 | 0 | 0 | 0 | 0 | 0 | 0 |
| 0 | 0 | 1 | 0 | 0 | 0 | 0 | 0 |
| 0 | 0 | 1 | 0 | 0 | 0 | 0 | 0 |
| 0 | 1 | 0 | 1 | 1 | 0 | 0 | 1 |
| 0 | 0 | 0 | 1 | 0 | 1 | 0 | 1 |
| 0 | 0 | 0 | 1 | 0 | 0 | 1 | 0 |
| 1 | 1 | 1 | 1 | 0 | 0 | 1 | 0 |

FIG. 8A

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 0 | 0 | 0 | 1 | 2 | 3 | 4 | 5 | 6 | 7 | 8 | 9 |

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 0 | 0 | 0 | 1 | 2 | 3 | 4 | 5 | 6 | 7 | 8 | 9 |

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 0 | 0 | 0 | 1 | 2 | 3 | 4 | 5 | 6 | 7 | 8 | 9 |

| | COL. 1 | | | | COL. 2 | | | |
|---|---|---|---|---|---|---|---|---|
| | H | G | F | E | D | C | B | A |
| ROW 1 | NMSI_LENGTH + 1 | | | | NMSI_LENGTH + 2 | | | |
| ROW 2 | NMSI_LENGTH - 1 | | | | NMSI_LENGTH | | | |
| ROW 3 | NMSI_LENGTH - 3 | | | | NMSI_LENGTH - 2 | | | |
| ROW 4 | NMSI_LENGTH - 5 | | | | NMSI_LENGTH - 4 | | | |
| ROW 5 | NMSI_LENGTH - 7 | | | | NMSI_LENGTH - 6 | | | |
| ROW 6 | NMSI_LENGTH - 9 | | | | NMSI_LENGTH - 8 | | | |
| ROW 7 | NMSI_LENGTH - 11 | | | | NMSI_LENGTH - 10 | | | |
| ROW 8 | FILLER | | | | NMSI_LENGTH - 12 | | | |

FIG. 10A

| | COL. 1 | | | | COL. 2 | | | |
|---|---|---|---|---|---|---|---|---|
| | H | G | F | E | D | C | B | A |
| ROW 1 | ELEMENT NO. 7 | | | | ELEMENT NO. 8 | | | |
| ROW 2 | ELEMENT NO. 5 | | | | ELEMENT NO. 6 | | | |
| ROW 3 | ELEMENT NO. 3 | | | | ELEMENT NO. 4 | | | |
| ROW 4 | ELEMENT NO. 1 | | | | ELEMENT NO. 2 | | | |
| ROW 5 | FILLER | | | | ELEMENT NO. 0 | | | |
| ROW 6 | FILLER | | | | FILLER | | | |
| ROW 7 | FILLER | | | | FILLER | | | |
| ROW 8 | FILLER | | | | FILLER | | | |

FIG. 10B

| H | G | F | E | D | C | B | A |
|---|---|---|---|---|---|---|---|
| 0 | 0 | 1 | 0 | 0 | 0 | 0 | 1 |
| 0 | 1 | 0 | 0 | 0 | 0 | 1 | 1 |
| 0 | 1 | 1 | 0 | 0 | 1 | 0 | 1 |
| 1 | 0 | 0 | 0 | 0 | 1 | 1 | 1 |
| 1 | 1 | 1 | 1 | 1 | 0 | 0 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 11A

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 0 | 0 | 5 | 1 | 2 | 3 | 4 | 5 | 6 | 7 | 8 | 9 |

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 0 | 3 | 4 | 5 | 1 | 2 | 3 | 4 | 5 | 6 | 7 | 8 | 9 |

| ELEMENT NO. | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | 0 | 0 | 2 | 3 | 4 | 5 | 1 | 2 | 3 | 4 | 5 | 6 | 7 | 8 | 9 |

| | COL. 1 | | | | COL. 2 | | | |
|---|---|---|---|---|---|---|---|---|
| | H | G | F | E | D | C | B | A |
| ROW 1 | ELEMENT NO. 11 | | | | ELEMENT NO. 12 | | | |
| ROW 2 | ELEMENT NO. 9 | | | | ELEMENT NO. 10 | | | |
| ROW 3 | ELEMENT NO. 7 | | | | ELEMENT NO. 8 | | | |
| ROW 4 | ELEMENT NO. 5 | | | | ELEMENT NO. 6 | | | |
| ROW 5 | ELEMENT NO. 3 | | | | ELEMENT NO. 4 | | | |
| ROW 6 | ELEMENT NO. 1 | | | | ELEMENT NO. 2 | | | |
| ROW 7 | FILLER | | | | ELEMENT NO. 0 | | | |
| ROW 8 | FILLER | | | | FILLER | | | |

FIG. 12B

| H | G | F | E | D | C | B | A |
|---|---|---|---|---|---|---|---|
| 0 | 0 | 1 | 1 | 0 | 0 | 1 | 0 |
| 0 | 1 | 0 | 1 | 0 | 1 | 0 | 0 |
| 0 | 0 | 1 | 0 | 0 | 0 | 0 | 1 |
| 0 | 1 | 0 | 0 | 0 | 0 | 1 | 1 |
| 0 | 1 | 1 | 0 | 0 | 1 | 0 | 1 |
| 1 | 0 | 0 | 0 | 0 | 1 | 1 | 0 |
| 1 | 1 | 1 | 1 | 1 | 0 | 0 | 1 |
| 1 | 1 | 1 | 1 | 1 | 1 | 1 | 1 |

CONVERSION OF INTERNATIONAL MOBILE STATION IDENTITY (IMSI) NUMBER

BACKGROUND OF THE INVENTION

1. Field of the Invention

The present invention relates generally to telecommunications systems and more particularly to wireless communication systems and the conversion of an International Mobile Station Identity (IMSI) number from one format to another format to allow global roaming capability within a code division multiple access (CDMA) cellular communications system.

2. Description of the Related Art

CDMA wireless telephones, hereinafter referred to as mobile stations (MS), register with a Mobile Switching Center (MSC) via a base station (BS) by. transmitting an encoded associated identification number known as the International Mobile Station Identity (IMSI) number to the serving BS.

The IMSI number consists of up to fifteen numerical characters (0–9). An IMSI consists of a three digit mobile country code (MCC) and a variable length national mobile station identity (NMSI). The NMSI consists of two variable length parts: the mobile network code (MNC) and the mobile station identification number (MSIN). A Class 0 IMSI is fifteen digits in length. A Class 1 IMSI is less than fifteen digits in length.

In the United States the variable length MNC and MSIN are set by the FCC to three digits and nine digits respectively. This results in IMSI numbers having a length of fifteen digits. A country may set the length of the MNC to be either one, two or three digits and the length of the MSIN to be between one and eleven digits. The length of the MNC plus the length of the MSIN must be no more than twelve digits.

An IMSI number is stored in CDMA wireless telephones as three parameters: MCC, IMSI_11_12, and IMSI_S. These IMSI parameters are transmitted from the mobile station to the base station. Additional information that may be transmitted from the mobile station to the base station along with the IMSI number may include an IMSI length indicator, the IMSI Class and the IMSI Type, as described further below. To ensure compatibility between a mobile station and a base station from different manufacturers, the procedures and protocol for the format and transmission of messages from an MS to a BS have been standardized. For an identification of industry standards relating to CDMA cellular communications systems, reference is made to TIA/EIA Standard IS-95, entitled "Mobile Station-Base Station Compatibility Standard for Dual-Mode Wideband Spread Spectrum Cellular System." Accordingly, the IMSI number is transmitted in a format compliant with TIA/EIA/IS-95, and includes the three parameters MCC, IMSI_11_12, and IMSI_S.

FIG. 1 is a block diagram of a conventional mobile network illustrating a mobile station (MS) 14 communicating with a mobile switching center (MSC) 10. System configuration and operation of a code division multiple access (CDMA) cellular communications system is well known to those skilled in the art. Accordingly, detailed information concerning CDMA system configuration and operation is not provided. However, technical information concerning this topic may be obtained by referring to a number of available documents. For example, for a description of the use of CDMA techniques in a multiple access communications system, reference is made to U.S. Pat. No. 4,901,307, entitled "Spread Spectrum Multiple Access Communication System Using Satellite or Terrestrial Repeaters." Furthermore, for a description of the generation of signal waveforms for use in a CDMA communications system, reference is made to U.S. Pat. No. 5,103,459, entitled "System and Method for Generating Signal Waveforms in a CDMA Cellular System" and U.S. Pat. No. 5,883,888, entitled "Seamless Soft Handoff in a CDMA Cellular Communications System." The disclosures of the foregoing references are expressly incorporated by reference herein.

The heart of a typical wireless telecommunications system is the Mobile Switching Center that is connected to a plurality of base stations that are dispersed throughout the geographic area serviced by the system. The geographic area serviced by a wireless telecommunications system is partitioned into a number of spatially distinct areas called "cells." Each MSC is responsible for, among other things, establishing and maintaining calls between mobile stations and between a mobile station and a wireline terminal, which is connected to the system via the local and/or long-distance networks. Referring to FIG. 1, whenever the mobile station 14 activates or roams into a MSC coverage area, i.e., the "cell" for which the MSC is responsible, the mobile station transmits the stored IMSI number to the serving MSC 10 via a base station (BS) 20. The IMSI number is transmitted over a radio channel 22 in a format complicate with TIA/EIA/IS-95 and detected by antenna 21 of BS 20.

Base station 20, in turn, transmits at least a portion of the IMSI number to the serving MSC 10, such as for example via communication line 24. The procedures and protocol for communication between the base station 20 and the MSC 10 have also been standardized. For an identification of industry standards relating to these communications, reference is made to TIA/EIA/IS634-A, "MSC-BS Interface for Public Wireless Communication Systems." The format for messages between base station 20 and MSC 10 is a variable octet field.

In order to provide mobile service to the newly registered MS 14, the serving MSC 10 transmits a Mobile Application Part (MAP) based signal, such as a location update signal, to a home location register (HLR) 12 via a signaling link 26. Such a signal informs the HLR 12 of the network address associated with the MSC 10 currently serving the MS 14 and also requests requisite subscriber information for providing mobile service to the roaming MS 14. The HLR 12 updates its database to store the netwvork address representing the serving MSC 10 and also copies the requesting subscriber information to a visitor location register (VLR) 30 associated with the serving MSC 10. The net work address representing the serving MSC 10 stored in the HLR 12 is later utilized by the mobile network to reroute any incoming call intended for the mobile station 14 to the serving MSC 10. Accordingly, whenever a telecommunications subscriber dials a telephone number for the mobile station 14, the HLR 12 is queried by the mobile network to determine the current location of the MS 14. Utilizing the stored network address in HLR 12 representing the serving MSC 10, the HLR 12 requests a roaming number from the serving MSC 10 in response to the receipt of the query signal. The roaming number provided by the serving MSC 10 is then used by the telecommunications network to route the incoming signal towards the serving MSC 10. The serving MSC 10 then pages the mobile station 14 and accordingly establishes a speech connection with the mobile station 14, if available.

If MS 14 roams out of MSC 10 coverage area and into MSC 31 coverage area, MSC 10 will hand-off the communication to MSC 31 and base station 32. To ensure compatibility between two MSCs, the procedures and protocol for the format and transmission of messages have been standardized. For an identification of industry standards relating to these communications, reference is made to ANSI/TIA/EIA Standard 41, "Cellular Radio telecommunications Intersystem Operations." The format for messages between two MSCs, such as for example MSC 10 and MSC 31 for FIG. 1, as specified by ANSI/TIA/EIA-41 is an 8-octet structure as illustrated in FIG. 2, wherein each of locations A–H represents one bit in each of the eight rows. Additionally, some manufacturers utilize proprietary interfaces between an MSC and BS that utilize the ANSI/TIA/EIA-41 format.

There are some shortcomings, however, with conventional mobile systems used in the United States. Currently, only a portion of the information included in the IMSI number, specifically the IMSI_S parameter, is sent from the BS to the MSC. As such, information included in the MCC and IMSI_11_12 parameters is not utilized. A wireless communication system that utilizes only the IMSI_S parameter cannot support increased IMSI number functionality, since use of only the IMSI_S parameter allows the system to support only one IMSI class and type, i.e., a Class 0, Type 0 IMSI. Consequently, a CDMA telephone with an IMSI number that has a different class or type than Class 0, Type 0, will be unusable in the United States.

By complying with the requirements of ANSI/TIA/EIA-41, a wireless communication system can support increased IMSI number functionality, i.e., all types of IMSIs in both Class 0 and Class 1, by utilizing more of the information included in the IMSI number, such as for example the MCC and/or IMSI_11_12. However, since the IMSI number is received at the BS 20 from the MS 14 in a format that complies with TIA/EIA/IS-95, there exists an incompatibility from a network signaling standpoint since MSC 10 requires the IMSI number in a different format, i.e., a format that complies with ANSI/TIA/EIA-41. If the proper format is not used, a system will be unable to offer global roaming capability since only a portion of the IMSI number can be used, which will result in a loss of customers and corresponding sales. Therefore, it is necessary to convert the IMSI number received from the MS to a format compatible with ANSI/TIA/EIA-41.

Thus, there exists a need for a method and apparatus for converting an IMSI number in TIA/EIA/IS-95 format to an IMSI number in ANSI/TIA/EIA-41 format to support increased IMSI number functionality.

SUMMARY OF THE INVENTION

The present invention provides a unique method and apparatus for allowing a wireless communication system to offer increased IMSI number functionality and corresponding global roaming capability by converting an identification number received from a particular mobile station in the wireless communication system in a first format to a second format which allows for use of more information included in the identification number.

For example, a variable length IMSI number in TIA/EIA/IS-95 format is received at a base station in encoded form. The base station decodes the parameters included in the IMSI number into their original decimal values, and, if all parameters have not been sent in accordance with the IMSI type, will add the proper values for the unsent parameters. The MCC, IMSI_S, and IMSI_11_12 parameters of the IMSI number are then stored in a 15-digit IMSI array. The contents of each location of the 15-digit array are associated with a specific location in an 8-octet structure which is required by ANSI/TIA/EIA-41. The value in each location of the array is converted to Binary Coded Decimal (BCD) format and mapped to its associated location in the 8-octet structure. The IMSI number will then be in a format compliant with ANSI/TIA/EIA-41, thus allowing a service provider to offer increased IMSI functionality to its customers and allow the IMSI number to be used as a national mobile station identifier which will result in global roaming capability for CDMA telephones.

These and other advantages and features of the invention will become apparent from the following detailed description of the invention which is provided in connection with the accompanying drawings.

BRIEF DESCRIPTION OF THE DRAWINGS

FIG. 1 is a block diagram of a conventional mobile network illustrating a mobile station communicating with a mobile switching center for registering;

FIG. 2 illustrates the 8-octet format required for messages being transmitted from one mobile switching center to another mobile switching center in accordance with ANSI/TIA/EIA-41;

FIGS. 5A and 5B illustrate examples of the 15-digit array used in accordance with the present invention;

FIG. 6 illustrates the location mapping of the 15-digit array to an 8-octet structure for a Class 0 IMSI;

FIG. 7 illustrates the 8-octet structure after a specific Class 0 IMSI number has been mapped to it;

FIGS. 8A, 8B and 8C illustrate examples of the 15-digit array used in accordance with the present invention with an exemplary Class 1 IMSI;

FIG. 9 illustrates the location mapping of the 15-digit array to an 8-octet structure for a Class 1 IMSI;

FIGS. 10A and 10B illustrate the 8-octet structure after the exemplary Class 1 IMSI number has been mapped to it;

FIGS. 11A, 11B and 11C illustrate examples of the 15-digit array used in accordance with the present invention with a second exemplary Class 1 IMSI; and FIGS. 12A and 12B illustrate the 8-octet structure after the second exemplary Class 1 IMSI number has been mapped to it.

DETAILED DESCRIPTION

Figure 3:
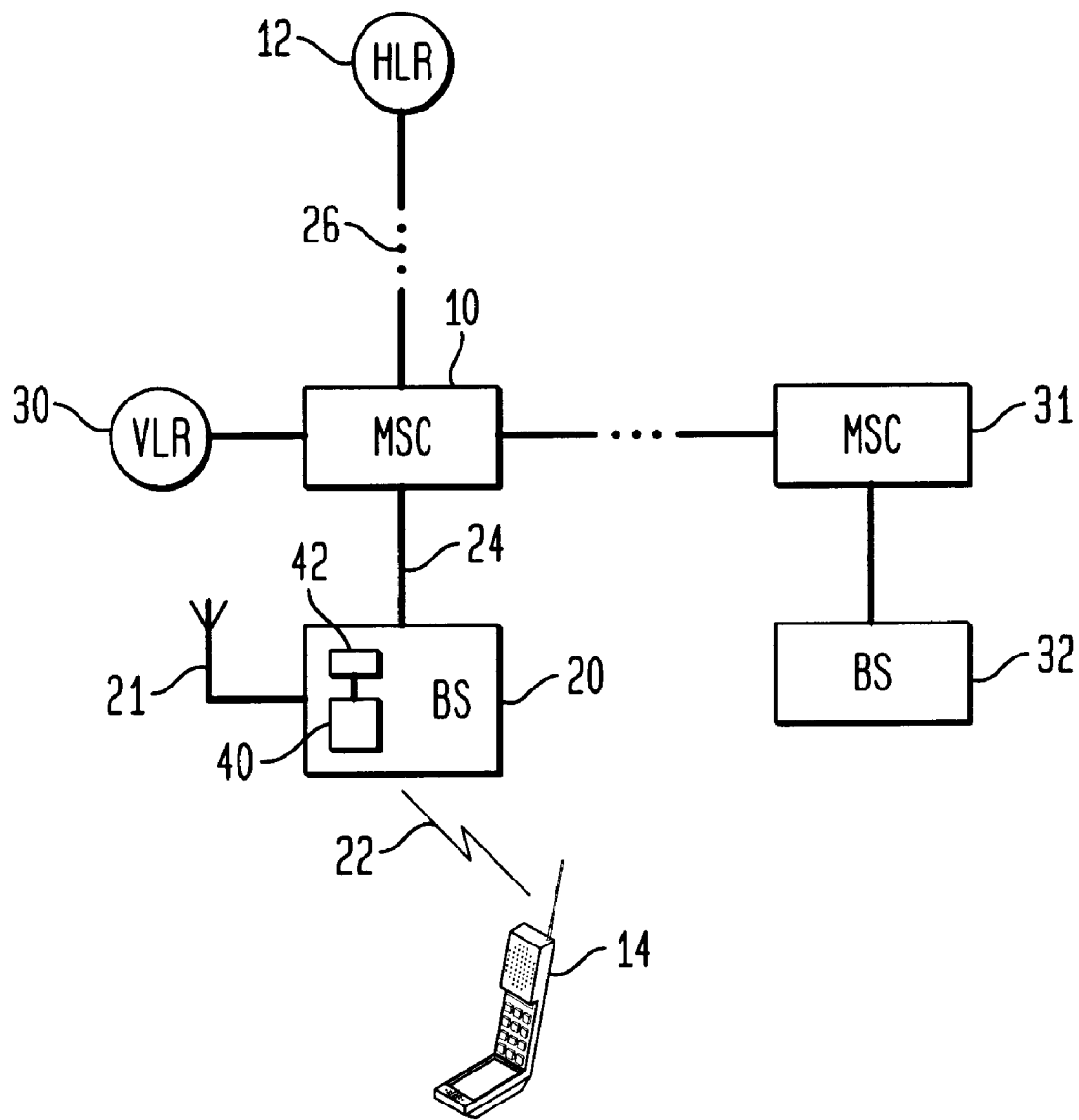
FIG. 3 illustrates in block diagram form a mobile network capable of mapping an IMSI address from TIA/EIA/IS-95 format to ANSI/TIA/EIA-41 format in accordance with the present invention.

The present invention will be described as set forth in the embodiments illustrated in FIGS. 3–12. Other embodiments may be utilized and structural, logical or programming changes may be made without departing from the spirit or scope of the present invention. Like items are referred to by like reference numerals throughout the description.

In accordance with the present invention, a service provider of a wireless communication system can offer increased IMSI functionality to their customers by converting the IMSI number received by a base station from a mobile station in TIA/EIA/IS-95 format to ANSI/TIA/EIA-41 format for sending from the base station to a mobile switching center.

FIG. 3 is a block diagram of a mobile network capable of increased IMSI functionality in accordance with the present invention. Whenever the mobile station 14 turns on its unit for the first time or roams into a new MSC coverage area, the mobile station transmits the stored IMSI number to the serving MSC 10 via a base station (BS) 20. The IMSI number is transmitted in a format compliant with TIA/EIA/IS-95, and consists of up to 15 numerical characters consisting of three parameters: IMSI_S, IMSI_11_12, and the MCC as previously described. The IMSI number is transmitted over a radio channel 22 and detected by antenna 21 of BS 20.

In accordance with the present invention, BS 20 includes a controller 40 adapted to convert the IMSI number sent from MS 14 to BS 20 in TIA/EIA/IS-95 format to an IMSI number in an 8-octet format as required by ANSI/TIA/EIA-41 by utilizing memory 42. Controller 40 can include a microprocessor, and can be used for other functions within base station 20 as well. Memory 42 can be any type of memory as is known in the art, and can be for example a 15-digit array. The converted IMSI number can then be sent from base station 20 to MSC 10 for processing similarly as described with respect to FIG. 1 in a format compliant with ANSI/TIA/EIA-41, thus allowing a service provider to offer increased IMSI functionality to its customers.

In accordance with TIA/EIA/IS-95, MS 14 sends BS 20 up to a 15 digit IMSI number in the following format:

| Parameter | Name | Digit Nos. |
| --- | --- | --- |
| Mobile Country Code | MCC | 13–15 |
| IMSI Digits 11 and 12 | IMSI_11_12 | 11–12 |
| IMSI Digits 1 through 10 | IMSI_S | 1–10 |

MS 14 may also send BS 20 the following IMSI address parameters:

| Parameter | Name |
| --- | --- |
| IMSI length indicator | IMSI_ADDR_NUM |
| IMSI Class | IMSI_CLASS |
| IMSI Type | IMSI_CLASS_X_TYPE |
| Reserved Information | RESERVED |

The MCC is a three-digit number that specifies the country of origin of the subscriber. The specific country code for each country is specified in the International Telecommunication Union document ITU-T recommendation E.212, "Identification Plan for Land Mobile Stations." The IMSI_11_12 (IMSI digits 11 and 12) are used to represent the 11$^{th}$ and 12$^{th}$ digits of the IMSI number. The IMSI_S (IMSI digits 1 through 10) is used to represent the least significant ten digits of the IMSI number. The IMSI_ADDR_NUM is an indicator from which the IMSI length can be calculated. For Class 0 IMSIs, the IMSI is fifteen digits in length. The IMSI_ADDR_NUM will be 0. For Class 1 IMSIs, the IMSI number will be less than fifteen digits in length. The IMSI length can be calculated as follows:

$NMSI\_LENGTH = IMSI\_ADDR\_NUM + 4$ $IMSI\_LENGTH = NMSI\_LENGTH + 3$

Therefore, the IMSI_LENGTH=IMSI_ADDR_NUM+7.

The IMSI_CLASS and IMSI_CLASS_X_TYPE represent the class and type of the IMSI number based on the length of the IMSI number. The IMSI_CLASS represents the class of the IMSI based on the length of the IMSI number as previously described. For any given IMSI, the IMSI type provides an indication of the transmitted and omitted parameters between the MS 14 and BS 20. The MSC 10 is allowed to special and broadcast the most likely matched IMSI_11_12 and MCC parameters. If the IMSI_11_12 and/or MCC of MS 14 match that being broadcast by MSC 10, the matching parameter may be omitted from the transmission and the IMSI type is modified to indicate parameter omission. By reducing the number of parameters that must be transmitted, the transmission efficiency is increased. For example, for a Class 0 IMSI, there are four types: Type 0, Type 1, Type 2 and Type 3. For Type 0, only the IMSI_S parameter is included in the transmission. For Type 1, only the IMSI_S and IMSI_11_12 parameters are included in the transmission. For Type 2, only the IMSI_S and MCC parameters are included in the transmission. For Type 3, the IMSI_S, IMSI_11_12, and MCC are all included in the transmission. For a Class 1 IMSI, there are two types: Type 0 and Type 1. A Type 0 includes the IMSI_S and IMSI_11_12 parameters. A Type 1 includes the IMSI_S, IMSI_11_12, and MCC parameters.

Figure 4:
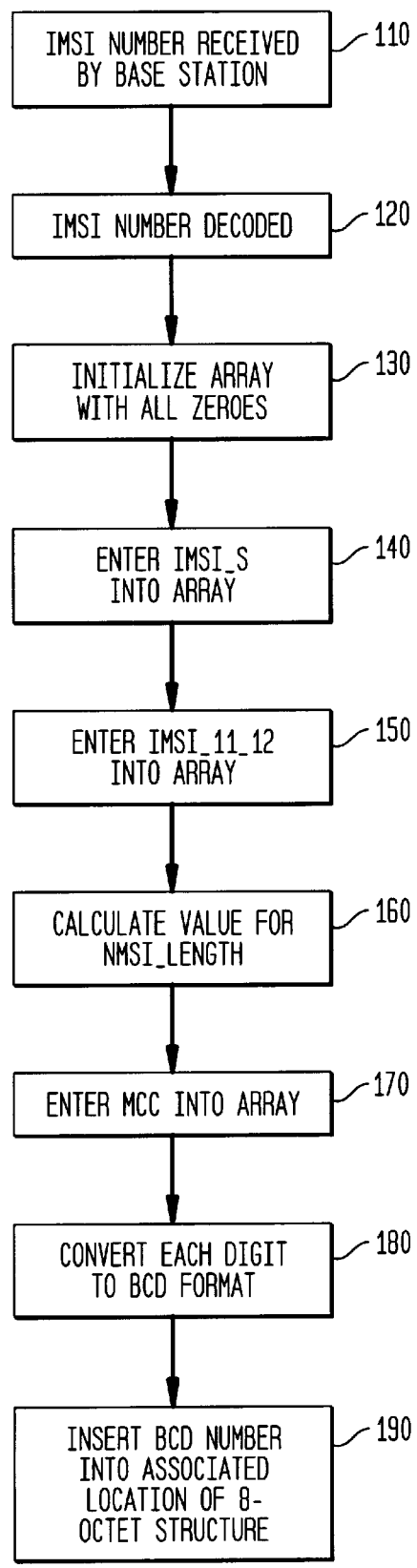
FIG. 4 illustrates in flow chart form a method for mapping an IMSI address from TIA/EIA/IS-95 format to ANSI/TIA/EIA-41 format in accordance with the present invention.

FIG. 4 illustrates a method for mapping an IMSI number in TIA/EIA/IS-95 format as described above to an IMSI number in an 8-octet format as required by ANSI/TIA/EIA-41 according to the present invention.

Suppose for example, the mobile station 14 sends the base station 20 the following Class 0 IMSI number, i.e., an IMSI number having 15 digits:

$MCC=310; IMSI\_11\_12=00; IMSI\_S=2029551212$

In step 110, the base station 20 will receive the IMSI number which is sent by the mobile station 14 in encoded form in accordance with TIA/EIA/IS-95. It should be understood that the IMSI number may include all parameters or only a portion of the parameters depending upon the IMSI_CLASS_X_TYPE as previously described. For example, if the IMSI number above is a Type 0, only the IMSI_S will be included in the IMSI number, and base station 20 will provide the proper values for the MCC and IMSI_11_12 parameters.

In step 120, the base station 20 decodes the IMSI address parameters to obtain the original decimal values, i.e., MCC=310; IMSI_11_12=00; and IMSI_S=2029551212.

In step 130, an array in memory 42, such as for example a 15-digit array, is initialized with all zeroes. The array elements, i.e., each location in the array, are numbered from 0 to 14, right to left. Thus, memory array 42 would be as illustrated in FIG. 5A. In step 140, the decoded original decimal value for IMSI_S is stored in memory, 42 in element numbers 0–9. In step 150, the value of IMSI_11_12 is entered into the array 42 in element numbers 10 and 11. In step 160, a value for the NMSI_LENGTH is calculated, where NMSI_LENGTH=IMSI_LENGTH−3. Thus, in the above example, NMSI_LENGTH=15−3=12. In step 170, the MCC is entered into array 42 at the elements corresponding to the values of the NMSI_LENGTH+2, NMSI_LENGTH+1, and NMSI_LENGTH respectively. Thus, in the above example the MCC of 310 would be entered into element numbers 14, 13 and 12 of array 42 respectively, resulting in memory array 42 appearing as illustrated in FIG. 5B.

In step 180, the digit in each location of memory array 42 is converted from decimal form to its equivalent four bit Binary Coded Decimal (BCD) format. Thus, for example, the digit 2 in BCD is 0010, digit 5 is 0101, digit 9 is 1001, etc. Each element number of memory array 42 is associated with a specific column and row of the 8-octet array structure defined by the requirements of ANSI/TIA/EIA-41 as illustrated in FIG. 6. Thus, as shown in FIG. 6, element numbers 0, 2, 4, 6, 8, 10, 12 and 14 from memory array 42 are associated with column 2 of the 8-octet array structure, rows 8-1 respectively. Element numbers 1, 3, 5, 7, 9, 11, and 13 of array 42 are associated with column 1 of the 8-octet array structure, rows 7-1 respectively, and row 8 of column 1 is occupied by a filler as specified by ANSI/TIA/EIA-41, i.e., the BCD number 1111.

Referring back to FIG. 4, in step 190, the converted decimal number from each element number of memory array 42 or a filler is mapped and inserted into its associated location of the 8-octet array structure. For example, the IMSI number 310002029551212 from above when inserted into the 8-octet array structure would be as illustrated in FIG. 7. Once the values have been inserted into the 8-octet array structure as shown in FIG. 7, the IMSI number is in a format compliant with ANSI/TIA/EIA-41. The 8-octet array structure can be stored in BS 20 and then sent to MSC 10, or alternatively can be sent from BS 20 directly to MSC 10.

Now suppose MS 14 sends BS 20 a Class 1 IMSI number, i.e., an IMSI with a length less than 15 digits, such as for example an IMSI of 123456789. Thus, the IMSI length is nine digits.

In step 110, the base station 20 will receive the IMSI number which is sent by the mobile station 14 in encoded form in accordance with TIA/EIA/IS-95. It should be understood that the IMSI number may include all parameters or only a portion of the parameters depending upon the IMSI_CLASS_X_TYPE as previously described. In step 120, the base station 20 decodes the IMSI address parameters. In a Class 1 IMSI, the MCC is the first three digits. Thus, in this example, the MCC is 123. When an IMSI has fewer than twelve digits, digits with a value equal to zero are added to the most significant side to obtain a total of twelve digits and the IMSI_11_12 is equal to the 11$^{th}$ and 12$^{th}$ digits from the end of the resulting number. Thus, in the example above, since the IMSI has less than twelve digits, zeroes are added to the most significant side to obtain the following number: 000123456789. The 11$^{th}$ and 12$^{th}$ digits from the end are 0 and 0 respectively, thus IMSI_11_12=00. The IMSI_S is the first ten digits from the end, thus in this example IMSI_S=0123456789.

In step 130, an array in memory 42, such as for example a 15-digit array, is initialized with all zeroes. The array elements, i.e., each location in the array, are numbered from 0 to 14, right to left. Thus, memory array 42 would be as illustrated in FIG. 5A.

In step 140, the IMSI_S is entered into array 42 in element numbers 0–9. Thus, array 42 would appear as illustrated in FIG. 8A. In step 150, the value for IMSI_11_12 is entered in element numbers 10 and 11 of array 42, resulting in array 42 appearing as illustrated in FIG. 8B. It should be noted that the array 42 in FIG. 8B has not changed in appearance from that of FIG. 8A since the values in element numbers 10 and 11 of array 42 in FIG. 8A have been replaced with identical values, i.e., 0,0, in FIG. 8B.

In step 160, a value for NMSI_LENGTH is calculated, where NMSI_LENGTH=IMSI_LENGTH–3. Thus, in the example above, the NMSI–LENGTH=6. In step 170, the MCC is entered in array 42 at the elements corresponding to the values of the NMSI_LENGTH+2, NMSI_LENGTH+1, and NMSI_LENGTH respectively. Thus, in the above example, the MCC of 123 would be entered in the 8$^{th}$ (NMSI_LENGTH+2), 7$^{th}$ (NMSI_LENGTH+1) and 6$^{th}$ (NMSI_LENGTH) elements, resulting in array 42 appearing as illustrated in FIG. 8C. It should be noted that the array 42 in FIG. 8C has not changed in appearance from that of FIG. 8B since the values in element numbers 8, 7, and 6 of array 42 in FIG. 8B have been replaced with identical values, i.e., 1, 2, 3 respectively, in FIG. 8C.

In step 180, the digit in each location of memory array 42 is converted from decimal form to its equivalent four bit Binary Coded Decimal (BCD) number as previously described. Each location number of memory array 42 is associated with a specific column and row of the 8-octet array structure defined by the requirements of ANSI/TIA/EIA-41 as illustrated in FIG. 9. Thus, as shown in FIG. 9, column 1, rows 1 through 8, are respectively associated with the element numbers of array 42 specified by the values of NMSI_LENGTH+1, NMSI_LENGTH–1, NMSI_LENGTH–3, NMSI_LENGTH–5, NMSI_LENGTH–7, NMSI_LENGTH–9, NMSI_LENGTH–11, and a filler. Column 2 of the 8-octet array stricture, rows 1–8, are associated with the element numbers of array 42 specified by the values of NMSI_LENGTH+2, NMSI_LENGTH, NMSI_LENGTH–2, NMSI_LENGTH–4, NMSI_LENGTH–6, NMSI_LENGTH–8, NMSI_LENGTH–10, NMSI_LENGTH–12 respectively. If the value as determined above results in a number less than zero, a filler is associated with that location in the 8-octet array. For example, if the NMSI_LENGTH=9, the locations whose associated value is less than zero, i.e., NMSI_LENGTH–10, MSI_LENGTH–11, and NMSI_LENGTH–12, would be associated with a filler, i.e., BCD number 1111. Thus, in the above example in which the NMSI_LENGTH=6, each row of the 8-octet structure would be associated with an element location of array 42 as illustrated in FIG. 10A.

Referring back to FIG. 4, in step 190 the BCD number converted from the decimal number from each location of memory array 42 or the filler is mapped and inserted into its associated location of the 8-octet array structure. For example, the IMSI number 123456789 from above would be inserted into the 8-octet array structure as illustrated in FIG. 10B. Once the values have been inserted into the 8-octet array structure as shown in FIG. 10B, the IMSI number is in a format compliant with ANSI/TIA/EIA-41. The 8-octet array structure can be stored in BS 20 and then sent to MSC 10, or alternatively can be sent from BS 20 directly to MSC 10.

FIGS. 11 and 12 illustrate array 42 and an 8-octet array structure for a second example of a Class 1 IMSI number. Suppose for example MS 14 sends BS 20 a Class 1 IMSI number with a length of thirteen digits as follows: 2345123456789. Thus, MCC=234, IMSI_11_12=34 and IMSI_S=5123456789.

When the IMSI_S value is entered into array 42 (step 140 of FIG. 4), the array 42 would appear as illustrated in FIG. 11A. When the IMSI_11_12 value is entered into element numbers 10 and 11 of array 42 (step 150 of FIG. 4), the array 42 would appear as illustrated in FIG. 11B. The NMSI_LENGTH in this example is equal to 10 (IMSI_LENGTH (13)–3). Thus, the MCC will be entered into elements 12, 11, and 10 of array 42 (step 170 of FIG. 4), resulting in array 42 as illustrated in FIG. 11C.

Thus, in the above example in which the NMSI_LENGTH=10, each row of the 8-octet structure would be associated with an element location of array 42 as illustrated in FIG. 12A. After each digit has been converted to BCD format (step 180 of FIG. 4) and inserted into the 8-octet structure (step 190 of FIG. 4) in its associated location as illustrated in FIG. 12A, the 8-octet structure will be as illustrated in FIG. 12B.

Thus, in accordance with the present invention, an IMSI number received by a base station 20 in TIA/EIA/IS-95 format can be converted to ANSI/TIA/EIA-41 format, regardless of the length of the IMSI number, for sending to MSC 10, thus allowing for compatibility between the mobile station, base station and neighboring mobile switching centers. Since values for all three parameters of the IMSI number, i.e., the IMSI_S, IMSI_11_12, and MCC, are included in the ANSI/TIA/EIA-41 format, a wireless communication system can offer increased IMSI number functionality, i.e., support all types for both Class 0 and Class 1 IMSIs, and thus allow for global roaming capability.

While the present invention has been described with respect to the conversion of an IMSI number from TIA/EIA/IS-95 format to ANSI/TIA/EIA-41 format, it is to be understood that the conversion from ANSI/TIA/EIA-41 format to TIA/EIA/IS-95 format may also be accomplished by simply reversing the steps. Thus for example, when an IMSI number is received in ANSI/TIA/EIA-41 format such as illustrated in FIG. 7, each BCD number is converted to its decimal equivalent and mapped to an associated position in memory array 42. The IMSI number can then be read from memory array 42, encoded in TIA/EIA/IS-95 format, stored in BS 20 and sent to MS 14 or sent directly to MS 14 without storing in BS 20.

Reference has been made to embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Also, although the invention is preferably implemented in software, it may be implemented in hardware, software, or any combination of the two. All are deemed equivalent with respect to the operation of the invention. Accordingly, the invention is not to be considered as limited by the foregoing description, but is only limited by the scope of the appended claims.

What is claimed as new and desired to be protected by Letters Patent of the United States is:

1. A method for providing increased functionality of an IMSI identification number associated with a particular mobile station in a wireless communication system by converting said IMSI identification number from a first format to a second format, said method comprising:
   receiving said IMSI identification number in said first format over a radio channel at a base station, said first format comprising a plurality of parameters, each of said plurality of parameters comprising one or more decimal digits;
   storing each of said one or more decimal digits of each of said plurality of parameters of said IMSI identification number in a respective location of a memory in said base station;
   associating each of said respective locations of said memory with a respective position of an octet structure comprising said second format;
   determining an equivalent BCD number for each of said one or more decimal digits of each of said plurality of parameters of said IMSI identification number; and
   inserting each of said equivalent BCD numbers in a respective position of said eight octet structure in said second format that is associated with said respective location of said memory.

2. The method according to claim 1, wherein said identification number comprises an international mobile station identity number associated with said particular mobile station.

3. The method according to claim 2, wherein said parameters of said international mobile station identity number includes at least an IMSIS parameter.

4. The method according to claim 3, wherein said international mobile station identity number is received in an encoded form, and said method further comprises:
   decoding said encoded international mobile. station identity number.

5. The method according to claim 4, wherein said decoding step further comprises:
   determining a value of said IMSI_S parameter,
   determining a value of an MCC parameter associated with said particular mobile station; and
   determining a value of an IMSI_11_12 parameter associated with said particular mobile station.

6. The method according to claim 5, wherein said memory is an array with a plurality of element locations.

7. The method according to claim 6, wherein said storing step further comprises:
   storing said IMSI_S value into a first set of said plurality of element locations in said array.

8. The method according to claim 7, further comprising:
   storing said IMSI_11_12 value into a second set of said plurality of element locations in said array.

9. The method according to claim 8, further comprising:
   determining a length of a national mobile station identity number included in said international mobile station identity number.

10. The method according to claim 9, further comprising:
    storing said MCC value into a third set of said plurality of element locations in said array, said third set of element locations starting with an element location corresponding to a value of said length of said national mobile station identity number.

11. The method according to claim 2, wherein said first format is compliant with TIA/EIA/IS-95.

12. The method according to claim 11, wherein said second format is compliant with ANSI/TIA/EIA-41.

13. The method according to claim 2, further comprising the step of:
    sending said international mobile station identity number in said second format from said base station to a mobile switching center.

14. The method according to claim 13, further comprising the step of:
    storing said international mobile station identity number in said second format in said base station.

15. A method as defined in claim 1, further comprising including a filler value in any unoccupied elements of said octet structure.

16. A method as defined in claim 15, wherein said filler comprises BCD value 1111.

17. A method as defined in claim 15, wherein said octet structure has a fixed number of elements, and wherein said unoccupied elements are identified by the further steps of determining a difference between the number of said elements of said octet structure, and the number of said decimal digits of said plurality of parameters.

18. A method as defined in claim 17, wherein said octet structure further comprises an eight octet stricture.

19. A method as defined in claim 1, wherein said octet structure further comprises an eight octet structure.

20. A method for providing increased functionality of an IMSI identification number associated with a particular mobile station in a wireless communication system by converting said IMSI identification number from a first format to a second format, said method comprising the steps of:

receiving said IMSI identification number over a radio channel at a base station, said first format comprising a plurality of parameters, each of said plurality of parameters.

21. The method according to claim 20, wherein said identification number comprises an international mobile station identity number associated with said particular mobile station.

22. The method according to claim 21, wherein said memory is an array with a plurality of element locations.

23. The method according to claim 21, wherein said first format is compliant with ANSI/TIA/EIA-41.

24. The method according to claim 23, wherein said second format is compliant with TIA/EIA/IS-95.

25. the method according to claim 21, further comprising the step of:

sending said international mobile station identity number in said second format from said base station to a mobile switching center.

26. The method according to claim 25, further comprising the step of:

storing said international mobile station identity number in said second format in said base station.

27. A method as defined in claim 20, wherein said octet structure further comprises an eight octet structure.

28. A base station for use in a wireless communication system, said base station adapted to provide increased functionality of an IMSI identification number associated with a mobile station, said base station comprising:

an antenna for receiving a signal over a radio channel from said mobile station, said signal representing at least said IMSI identification number associated with said mobile station, said IMSI identification number comprising a plurality of parameters, each of said plurality of parameters comprising one or more decimal digits;
a memory; and
a controller connected to said memory, said controller adapted to:
store each of said one or more decimal digits of each of said plurality of parameters of said IMSI identification number in a respective location of said memory;
associate each of said respective locations of said memory with a respective position of an array;
determine an equivalent BCD number for each of said one or more decimal digits of each of said plurality of parameters of said IMSI identification number; and
insert each of said equivalent BCD numbers in a respective position of an octet structure.

29. The base station according to claim 28, wherein said identification number comprises an international mobile station identity number associated with said mobile station.

30. The base station according to claim 29, wherein said international mobile station identity number includes at least IMSI_S parameter.

31. The base station according to claim 30, wherein said international mobile station identity number is sent from said mobile station in an encoded form, and said controller is further adapted to decode said international mobile station identity number.

32. The base station according to claim 30, wherein said controller is further adapted to determine a value of said IMSI_S parameter, a value for an MCC parameter associated with said mobile station, and a value for an IMSI_11_12 parameter associated with said mobile station.

33. The base station according to claim 32, wherein said memory is an array with a plurality of element locations.

34. The base station according to claim 33, wherein said array has fifteen element locations.

35. The base station according to claim 33, wherein said controller is further adapted to store said IMSI_S value into a first set of said plurality of element locations in said array.

36. The base station according to claim 35, wherein said controller is further adapted to store said IMSI_11_12 value into a second set of said plurality of element locations in said array.

37. The base station according to claim 36, wherein said controller is further adapted to determine a length of a national mobile station identity number included in said international mobile station identity number.

38. The base station according to claim 37, wherein said controller is further adapted to store said MCC value into a third set of said plurality of element locations in said array, said third set of element locations starting with an element location corresponding to a value of said length of said national mobile station identity number.

39. The base station according to claim 28, wherein said controller includes a microprocessor.

40. The base station according to claim 28, wherein said international mobile station identity number is in TIA/EIA/IS-95 format.

41. The base station according to claim 40, wherein said array is an 8-octet array in ANSI/TIA/EIA-41 format.

42. The base station according to claim 28, wherein said base station is adapted to send said international mobile station identity number in said array format to a mobile switching center.

43. The base station according to claim 42, wherein said base station is further adapted to store said international mobile station identity number in said array format.

44. The base station according to claim 42, wherein said base station is further adapted to store said international mobile station identity number in said octet structure.

45. A base station as defined in claim 28, wherein said octet structure further comprises an eight octet structure.

46. A base station for use in a wireless communication system, said base station adapted to provide increased functionality of an IMSI identification number associated with a mobile station, said base station comprising:

a controller, said controller adapted to receive, over a radio channel, an IMSI identification number associated with a particular mobile station in a first format, said first format comprising a plurality of parameters, each of said plurality of parameters comprising one or more numbers, each of said one or more numbers located in a respective one of a plurality of positions of an array; and a memory connected to said controller, said memory comprising a plurality of locations, each one of said plurality of locations in said memory being associated with a respective one of said plurality of positions of said array, wherein said controller is further adapted to convert each of said one or more numbers to an equivalent decimal number, and store each of said decimal numbers in a location of said memory associated with a respective one of a plurality of positions of an octet structure.

47. The base station according to claim 46, wherein said identification number is an international mobile station identity number.

48. The base station according to claim 46, wherein said memory is an array with a plurality of element locations.

49. The base station according to claim 48, wherein said array has fifteen element locations.

50. The base station according to claim 46, wherein said controller includes a microprocessor.

51. The base station according to claim 46, wherein said first format is compliant with ANSI/TIA/EIA-41.

52. The base station according to claim 51, wherein said octet structure is compliant with TIA/EIA/IS-95.

53. The base station according to claim 46, wherein said controller is further adapted to store said decimal numbers.

54. A base station as defined in claim 46, wherein said octet structure further comprises an eight octet structure.

* * * * *